United States Patent [19]

Putnam et al.

[11] Patent Number: 5,035,088
[45] Date of Patent: Jul. 30, 1991

[54] MACHINE TOOL

[75] Inventors: Peter H. Putnam, Enderby; Michael P. Durcan, Ravenstone, both of England

[73] Assignee: Ex-Cell-O GmbH, Eislingen, Fed. Rep. of Germany

[21] Appl. No.: 456,389

[22] Filed: Dec. 26, 1989

Related U.S. Application Data

[63] Continuation of Ser. No. 76,293, Jul. 22, 1987, abandoned.

[30] Foreign Application Priority Data

Jul. 22, 1986 [GB] United Kingdom ............... 8617864

[51] Int. Cl.$^5$ .................................... B24B 51/00
[52] U.S. Cl. ........................ 51/165.71; 51/53; 51/108 R; 51/123 R; 51/145 T
[58] Field of Search .......... 51/35, 46, 48 R, 50 R, 51/53, 60, 93, 94 R, 96, 97 R, 97 NC, 103 R, 105 R, 105 EC, 108 R, 109 R, 123 R, 124 R, 134, 145 R, 145 T, 165.71, 165 R, 165.77, 281 R; 82/2 R, 28 R, 28 B; 409/163, 167, 168, 224

[56] References Cited

U.S. PATENT DOCUMENTS

| | | | |
|---|---|---|---|
| 4,529,342 | 7/1985 | Babel | 409/224 X |
| 4,561,216 | 12/1985 | Miyatake et al. | 51/165.92 |
| 4,617,764 | 10/1986 | Reibakh | 51/5 D |
| 4,619,078 | 10/1986 | Uhlig | 51/5 D |
| 4,686,796 | 8/1987 | Giebmanns | 51/165.71 X |
| 4,747,237 | 5/1988 | Giebmanns | 51/165.71 X |
| 4,813,187 | 3/1989 | Mushardt | 51/281 R |

FOREIGN PATENT DOCUMENTS 2143756  2/1985  United Kingdom ............ 51/165 R

Primary Examiner—James G. Smith
Attorney, Agent, or Firm—John C. Evans

[57] ABSTRACT

A workpiece W to be machined by a rotating cutting tool 32 is carried by a rotary workhead 22 which is in turn mounted on a rotary table 16 for movement relative thereto both rotationally about a first axis perpendicular to the rotation axis of the table 16 and rectilinearly along second and third mutually perpendicular axes. The plane of interpolation between the second and third axes lies perpendicularly to the first axis, irrespective of the angular setting of the table 16. Using a combination of movements, the machine tool is able to produce on the workpiece W an arcuate surface whose radius of curvature is different from the distance of that surface from the workhead rotation axis.

14 Claims, 3 Drawing Sheets

MACHINE TOOL

This is a continuation, of application Ser. No. 076,293, filed on July 22, 1987, now abandoned.

The present invention relates to a machine tool and particularly, but not exclusively, to a grinding machine, more especially a grinding machine of the type known as a creep feed grinding machine.

By the term creep feed grinding machine is meant a grinding machine having a high stock removal ability at a slow feed rate as distinct from a grinding machine producing solely a quality finish by reciprocal grinding.

Hitherto, in grinding a workpiece such as a nozzle guide vane for a gas turbine engine, the workpiece has been supported on its true axis on a rotary table having a fixed axis of rotation. With the workpiece rotatably supported in this manner, it was then ground by a grinding wheel in a known manner. On very large radius machines for machining stators having a diameter of, for example, greater than 1.3 meters, the workpiece has normally been supported on a rotatably mounted limb, having a rotating diameter of greater than 1.5 meters for instance, rather than upon a rotary table per se.

One disadvantage to these known arrangements is the size of the rotary table or rotating limb necessary to support a workpiece, particularly for large diameter workpieces.

Further, it has been essential that the workpiece has been centred very accurately radially, with its true axis of rotation in alignment with the axis of rotation of the rotary table.

According to one aspect of the present invention, there is provided a machine tool comprising a workhead upon which a workpiece to be machined is mounted in use, a rotary table upon which the workhead is mounted, a cutting tool for machining the workpiece, and means for effecting relative movement between the workhead and the cutting tool both rotationally about a first axis substantially perpendicular to the rotation axis of the rotary table and rectilinearly along second and third mutually perpendicular axes, the plane of interpolation between the second and third axes lying perpendicular to the first axis irrespective of the angular setting of the rotary table.

Conveniently, control means are provided to control relative movement between the workhead and the cutting tool, the control means being programmed such that the cutting tool machines on the workpiece an arcuate surface or a substantially arcuate surface whose radius of curvature is different from (preferably greater than) the distance between that surface and the first axis.

Desirably, control means are provided to control relative movement between the workhead and the cutting tool, the control means being programmable to allow for errors in the positioning of the workpiece on the workhead.

Advantageously, the workhead is mounted on the rotary table for movement relative thereto about said first axis and along said second and third axes.

The cutting tool can be arranged so that it rotates about an axis which is inclined to the first axis.

The machine tool may further comprise means permitting the workpiece to be angularly adjusted about an axis perpendicular to the first axis and about the rotation axis of the rotary table.

According to a second aspect of the present invention, there is provided a method of machining a workpiece, comprising mounting the workpiece on a workhead which is itself mounted upon a rotary table, and machining the workpiece with a cutting tool while effecting relative movement between the workhead and the cutting tool both rotationally about a first axis substantially perpendicular to the axis of rotation of the rotary table and rectilinearly along second and third mutually perpendicular axes, the plane of interpolation between the second and third axes being perpendicular to the first axis irrespective of the angular setting of the rotary table.

Preferably, the relative movement is achieved by moving the workhead relative to the rotary table.

During machining, a rotation axis of the cutting tool may be inclined to the first axis.

According to a third aspect of the present invention, there is provided a method of machining a workpiece to produce thereon an arcuate or substantially arcuate surface having a radius of curvature R, comprising mounting the workpiece on a workhead, and machining the workpiece with a rotating cutting tool while effecting relative movement between the workhead and the rotating cutting tool both rotationally about a first axis and rectilinearly along second and third mutually perpendicular axes, the plane of interpolation between the second and third axes being perpendicular to the first axis, the workpiece being mounted on the workhead such that said surface thereon is positioned at a distance from the first axis which is other than R.

Preferably, the workhead is rotatable about said first axis and is rectilinearly displaceable along said second and third axes, and during machining the first axis moves along an arcuate path centred upon the centre of curvature of said surface of the workpiece, and simultaneously therewith the workhead is rotated about said first axis at the same angular rate as the first axis moves about said centre of curvature.

Apart from the fact that the workpiece may be mounted upon a smaller workhead than hitherto, a further significant advantage of the invention lies in the feature that tolerances or other misalignments in the positioning of the workpiece on the workhead can be programmed into the control means.

The machine tool may be a milling or turning machine but is preferably a grinding machine, particularly a creep feed grinding machine and more especially a continuous dress creep feed grinding machine.

The invention will now be described further by way of example with reference to the accompanying drawings in which.

Figure 1:
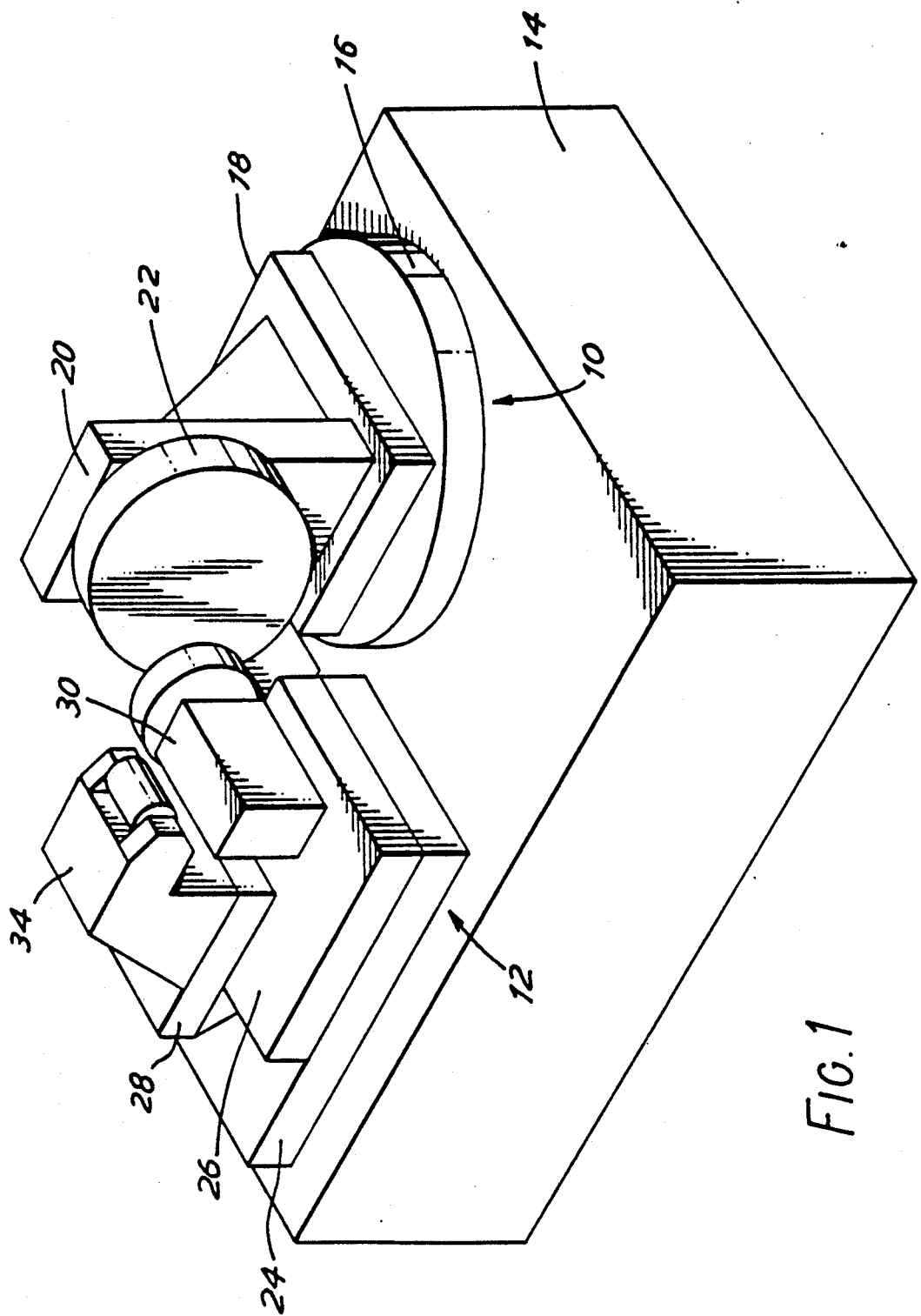
FIG. 1 is a diagrammatic perspective view of part of a grinding machine having a single spindle in accordance with a preferred embodiment of the invention.

In the drawing the workhead assembly is designated generally 10, the grinding wheel assembly 12, both assemblies being supported upon a common base 14.

The workhead assembly consists of a base rotary table 16 which is rotatable in either direction by an A.C. brushless servomotor. The table 16 mounts a horizontal axis fixture slide 18. The slide is movable in a rectilinear manner, in accordance with the direction of the arrows marked on it. It is to be noted that said direction of movement of the slide is in horizontal a plane containing the rotation movement of the rotary table 16, said plane being perpendicular to the vertical axis of rotation of rotary table 16.

A vertical axis fixture slide 20 is mounted upon the horizontal slide 18 for movement in a direction which is arranged in the same plane as the direction or axis of the horizontal slide but in a vertical manner and a rotary workhead 22 is mounted upon the slide 20 for rotational movement thereon.

Movement of slide 18 in the horizontal direction and movement of the slide 20 in the vertical direction shown are effective to move any location on the workpiece mounted on the workhead 22 in a plane of interpolation defined by the intersecting directions or axes of movement of slides 18, 20.

Both the vertical and horizontal slides 18, 20 are each driven by an A.C. brushless servomotor coupled to a ballscrew and nut assembly and incorporate linear optical scales. Movement of these slides combined with movement of the workhead 22 provide an interpolating movement. The rotary table 16 is used to produce the desired approach angle to the grinding wheel and is driven by an A.C. brushless servomotor and worm and wheel assembly, incorporating an optical encoder for positioning.

The grinding wheel assembly consists of a lower wheel slide 24, an upper wheel slide 26 and a dresser slide 28 each of which is independently movable in directions shown by the respective arrows marked thereon. A spindle 30 mounting a grinding wheel 32 is mounted directly upon the upper wheel slide 26 and a dresser unit 34 is mounted upon the dresser slide 28. The dresser unit operates in known manner to maintain the grinding wheel 32 dressed and in operative condition.

A workpiece to be ground is attached to the rotary workhead 22 by way of a nest which both clamps and locates the workpiece or workpieces to the workhead. If desired, the workpiece may be mounted upon a pallet in which case, it is the pallet which is clamped and located by the nest.

A grinding program is introduced into a control means (not shown) having a memory device, which control means is normally numerically controlled. The program is individual to the workpiece being machined and controls, throughout grinding, movement of the various slides and rotating tables.

During grinding, and simultaneously with rotation of the workhead, the axis of rotation of the workhead is displaced along a path, the profile of which is determined by the control means, which control means also controls movement of the slides 18 and 20 along mutually perpendicular rectilinear axes. By virtue of the invention, the contact point of the grinding wheel is maintained on a centreline through the centre of the grinding wheel and the axis of rotation of the workpiece thus enabling large workpieces to be ground on a compact machine.

Whereas in the illustrated embodiment of the invention, the three essentially-required movements, i.e. rectilinear movements of slides 18 and 20 and displacement about the axis of rotation of the workhead 22, are all brought about by movement of the workhead, it will be appreciated that one or more of these movements may be achieved by the provision of corresponding movements of the grinding wheel 32. Thus, the slides 18 and 20 and the equivalent to the rotary workhead 22 may all be provided on the grinding wheel assembly.

Figure 2:
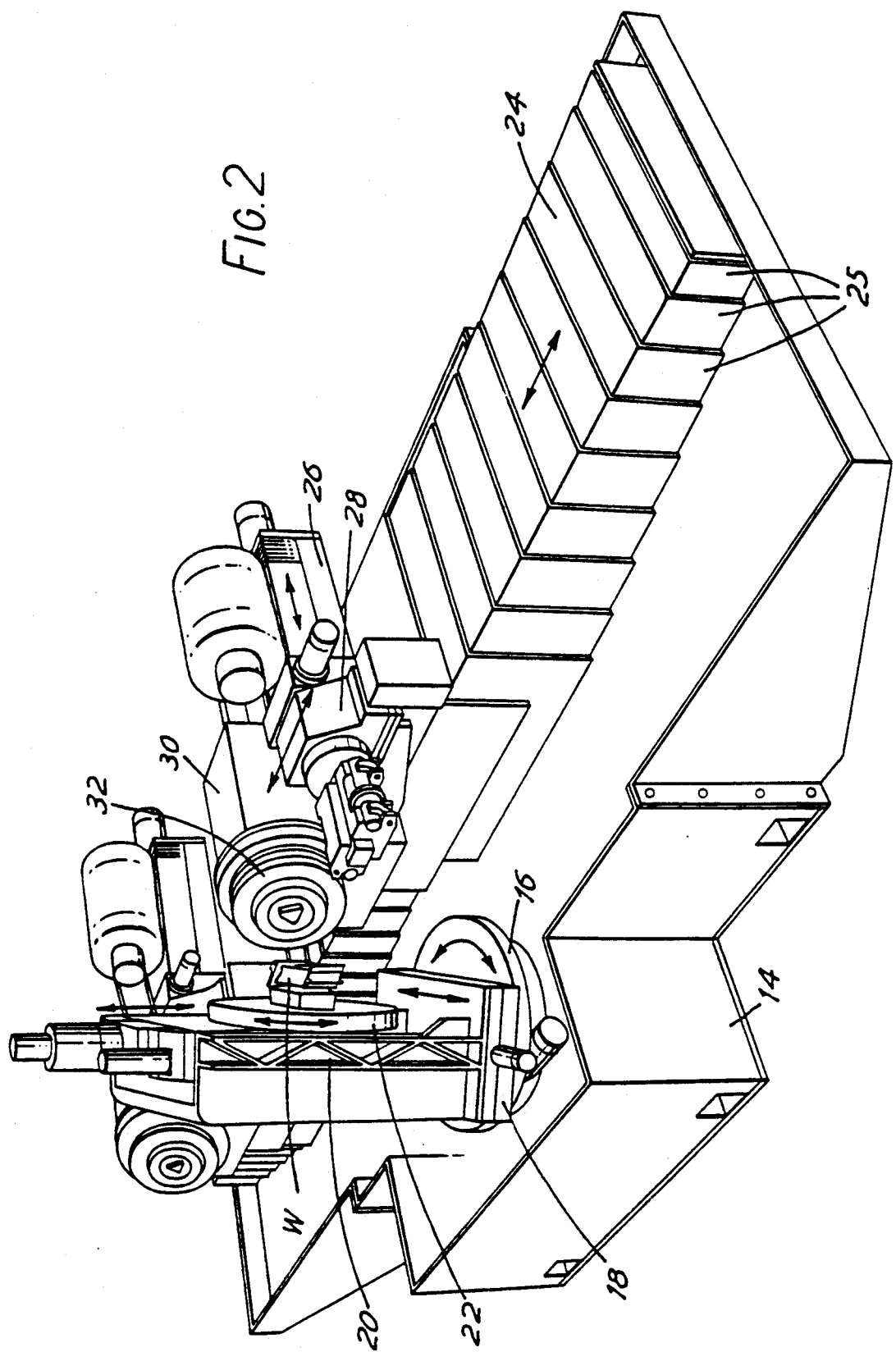
FIG. 2 is a view similar to FIG. 1 but of an alternative form of the grinding machine, having twin spindles.

In the grinding machine illustrated in FIG. 2 similar reference numerals have been used to designate similar parts to those of FIG. 1. As with the machine shown in FIG. 1 the grinding machine of FIG. 2 is used for grinding workpieces which require precision circular forms. In the twin spindle version of FIG. 2 the wheelslide ways are extended at either end and base support castings 15 are therefore added to the base 14.

One dresser slide assembly is mounted beside each of the two grinding spindles and provides the infeed and retraction of the diamond dresser roll or rolls. The dresser dresses its associated grinding wheel in known manner.

A further difference from the machine illustrated in FIG. 1 is the wheelslide assembly. Two wheelslide assemblies are provided each of which consists of a cross slide carrying its own spindle and drive assembly and mounted onto the main slide. All the slides are carried on pre-loaded linear recirculating slideway bearings which are automatically lubricated. The slides driven by an A.C. servomotor via a precision ballscrew and nut assembly. The slides are protected by steel way covers 25. By using a combination of both wheel slides, the grinding wheel may be positioned for wheel changing.

The workpiece W illustrated in FIG. 2 is a nozzle guide vane for a gas turbine engine. In this case, the machine forms on both the inner and outer peripheries of the guide vane. The machine performs all necessary movements of the individual machine elements to generate or interpolate the radius required on the workpiece. The required movements are controlled by a CNC controller, by a program specific to an individual component.

Figure 3:
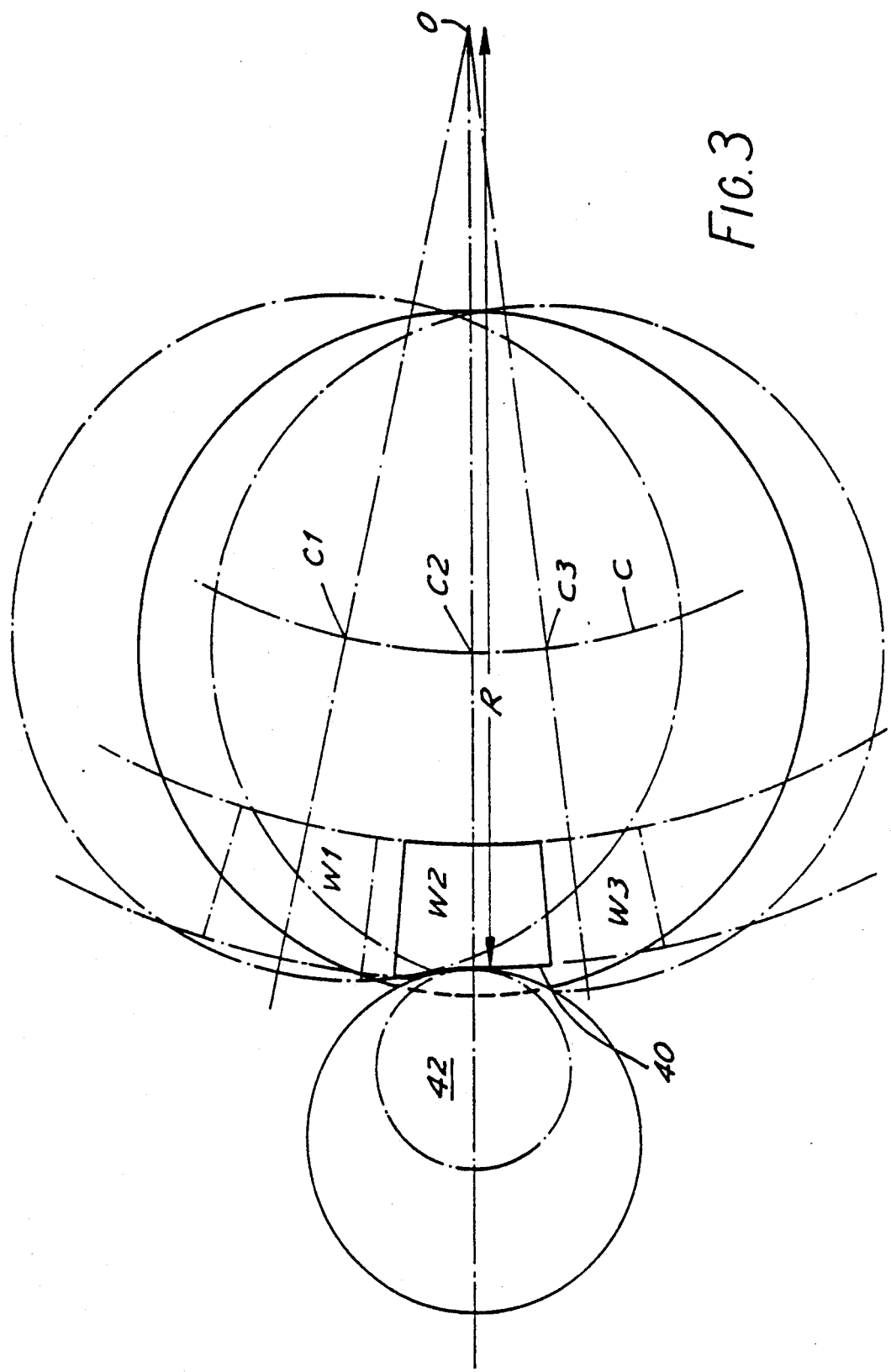
FIG. 3 is a sketch illustrating the machining of a surface on the workpiece which has a radius of curvature greater than that of the rotary workhead on which the workpiece is mounted.

Referring now to FIG. 3, a workpiece W has an outer surface 40 which is to be machined by a grinding wheel 42 to a circular configuration of radius R and centred at O. In the illustrated embodiment, the machining will produce an outwardly-facing form on the outer periphery of the workpiece, but the technique may be readily adapted to produce an inwardly-facing form on the outer periphery, or an inwardly- or outwardly-facing form on the inner periphery of the workpiece.

The workpiece is mounted on a rotary workhead as described above. As will be described, during machining the slides 18 and 20 are operated to move the rotation axis of the workhead along a curved path C, which is in fact an arc centred at O. At commencement of grinding, the workpiece occupies a position W1 shown in broken outline and the workhead rotation axis occupies a position C1. As grinding progresses, the axis of rotation of the workhead is displaced along a curved path C by displacement of the slides 18 and 20, so that by the time the workpiece has reached position W2 the workhead rotation axis is at position C2. At the point of completion of machining, the workpiece occupies a position W3 and the workhead rotation axis is at position C3.

At the same time as the workhead rotation axis is displaced along the curved path C, the workhead is also rotated about that axis through an angle equal to the angle moved by the workhead axis along the path C about the centre O. This results in an interpolated path for the surface 40 on the workpiece which is an arc of radius R and centred at O, and the surface 40 is thus machined to such a configuration by the grinding wheel 42. This technique enables the resultant machined surface to have a radius of curvature which is rather greater than the distance between that surface and the rotation axis of the workhead. Consequently, in order to machine an arcuate surface or a substantially arcuate surface of given radius R, the workhead can be made rather smaller in diameter than in conventional machine tools of this general type.

By suitably programming the control means, the slides 18 and 20 can be displaced such that the workhead rotation axis describes a path which is concave to the grinding wheel 42, rather than convex as shown in FIG. 3. In this case, the resultant machined surface on the workpiece will have a radius of curvature which is less than the distance between the machined surface and the workhead rotation axis.

It will be manifest that, during the machining process, the plane of interpolation between the rectilinear axes defined by movement of the slides 18 and 20, lies perpendicular to the rotation axis of the workhead 22, irrespective of the angular setting of the rotary table 16.

The above-described technique has particular advantages in cases where the rotation axis of the grinding wheel 42 is inclined relative to the workhead rotation axis. This is because the necessary movement of the workpiece W can be interpolated from a combined displacement of the slides 18 and 20 along their respective rectilinear axes and rotary displacement of the workhead about its rotation axis—this could not be achieved from displacement of the slides 18 and 20 alone.

Another advantage of the above-described technique resides in the fact that a workpiece need not be mounted on the workhead so that its positioning is exact, since known fixture errors can be allowed for in the programming of the control. That is to say, in the case of a nozzle guide vane, the workpiece will take the form of a pre-cast blank on which curved surfaces are roughly formed and which require to be machined precisely. The workpiece can be mounted on the workhead so that these surfaces occupy approximately the proper positions for machining. The differences between the actual position and the desired position can then be measured and programmed into the control. In this way, allowance can be made (for example) for the centre of curvature O being offset laterally from a line passing through the rotation axis of the grinding wheel and the workhead rotation axis, and for O being offset along that line. Also, allowance can be made for so-called "run off" during machining which would otherwise cause the machined surface to form part of a spiral rather than an arc about O.

In order to allow for angular errors in the positioning of the workpiece in a vertical plane, the grinding machine can include some means enabling the workpiece to be angularly adjusted about an axis perpendicular to both the rotation axis of the workhead 22, and the rotation axis of the rotary table 16.

We claim:

1. A machine tool comprising
   a bed,
   a workhead for mounting a workpiece to be machined;
   a plane of interpolation;
   defined locations of a predetermined shape of said workpiece to be machined on said workpiece, said locations being positionable in said plane of interpolation by a first machining axis means, said first machining axis means being a rotary axis and extending perpendicular to said plane of interpolation, a second rectilinear machining axis means; said second machining axis means being an X-axis and extending parallel to said plane of interpolation and a third rectilinear machining axis means; said third machining axis means being a Y-axis and extending parallel to said plane of interpolation;
   support means for said workhead including said first, second and third machining axis means, said support means being supported by said bed,
   a working tool rotatable about a tool axis and held by a tool drive means, said tool drive means being supported by said bed, and
   control means for controlling a machining operation to obtain said predetermined shape of said workpiece, said control means being in controlling connection with said first, second and third machining axis means for moving said workpiece with respect to said working tool in said plane of interpolation according to said predetermined shape of said workpiece to be machined.

2. A machine tool as claimed in claim 7, comprising angular setting means for adjusting said tool axis in variable angular relationship with respect to said plane of interpolation.

3. A machine tool as claimed in claim 2, wherein said angular setting means comprises a rotary table rotatable about a rotation axis.

4. A machine tool as claimed in claim 3, wherein said rotation axis is oriented parallel to said plane of interpolation.

5. A machine tool as claimed in claim 3, wherein said rotary table mounts said support means.

6. A machine tool as claimed in claim 7, wherein said control means are programmed such that said working tool machines said predetermined shape of said workpiece on said workpiece as an arcuate surface or a substantially arcuate surface whose radius of curvature is different from the distance between said arcuate surface and said first machining axis means by moving said workpiece in said plane of interpolation about said first machining means axis and along said second and third machining axis means.

7. A machine tool as claimed in claim 6, wherein said control means are programmed such that said arcuate surface or substantially arcuate surface has a radius of curvature greater than the distance between said arcuate surface or said substantially arcuate surface and said first machining axis means.

8. A machine tool as claimed in claim 6, wherein said control means are programmed to move said first machining axis means along an arcuate path centered on the center of curvature of said arcuate surface of said workpiece by controlling said first and second machining axis means, and to control said first machining axis means for movement of said workhead about said first machining axis means at the same angular rate of said first machining axis means is moved about said center of curvature.

9. A machine tool as claimed in claim 4, further comprising means permitting said workpiece to be angularly adjusted about an axis perpendicular to both said first machining axis means and said rotation axis of said rotary table.

10. A machine tool as claimed in claim 1, wherein said working tool is a grinding wheel.

11. A machine tool as claimed in claim 1, wherein control means are provided to control relative movement between said workhead and said cutting tool, said control means being programmable to allow for errors in the positioning of said workpiece on said workhead.

12. A machine tool as claimed in claim 6, wherein control means are provided to control relative movement between said workhead and said cutting tool, said control means being programmable to allow for errors in the positioning of said workpiece on said workhead.

13. A machine tool as claimed in claim 7, wherein control means are provided to control relative movement between said workhead and said cutting tool, said control means being programmable to allow for errors in the positioning of said workpiece on said workhead.

14. A machine tool as claimed in claim 1, wherein said tool axis is inclined to said first machining axis means.

* * * * *